US011563723B2

(12) United States Patent
Prasad

(10) Patent No.: US 11,563,723 B2
(45) Date of Patent: Jan. 24, 2023

(54) DATA PRIVACY PLUG-IN FOR ENTERPRISE INSTANT MESSAGING PLATFORM

(71) Applicant: Dell Products L. P., Round Rock, TX (US)

(72) Inventor: K V Sai Prasad, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 199 days.

(21) Appl. No.: 16/775,593

(22) Filed: Jan. 29, 2020

(65) Prior Publication Data

US 2021/0234839 A1  Jul. 29, 2021

(51) Int. Cl.
| | |
|---|---|
| *H04L 9/40* | (2022.01) |
| *G06F 21/62* | (2013.01) |
| *G06F 9/445* | (2018.01) |
| *H04L 51/04* | (2022.01) |
| *H04L 65/1069* | (2022.01) |
| *G06F 21/16* | (2013.01) |

(52) U.S. Cl.
CPC ...... *H04L 63/0414* (2013.01); *G06F 9/44526* (2013.01); *G06F 21/16* (2013.01); *G06F 21/6245* (2013.01); *H04L 51/04* (2013.01); *H04L 65/1069* (2013.01); *G06F 2221/0733* (2013.01)

(58) Field of Classification Search
CPC .. G06F 9/44526; G06F 21/16; G06F 21/6245; G06F 2221/0733; H04L 51/04; H04L 51/10; H04L 65/1069
See application file for complete search history.

(56) References Cited

U.S. PATENT DOCUMENTS

| | | | | |
|---|---|---|---|---|
| 8,001,187 | B2* | 8/2011 | Stochosky | H04L 51/04 709/205 |
| 8,555,360 | B1* | 10/2013 | Havemose | H04L 67/10 726/7 |
| 2007/0022163 | A1* | 1/2007 | Wormaid | G06F 3/048 709/206 |
| 2009/0037544 | A1* | 2/2009 | Wang | H04L 51/04 709/206 |

(Continued)

*Primary Examiner* — Linglan Edwards
(74) *Attorney, Agent, or Firm* — Krishnendu Gupta; Deepika Bhayana; Derek Lam

(57) ABSTRACT

A plug-in module, which, in combination with a host module, prevents unauthorized copying—like screen captures, screenshots, or screen recordings—of the streaming content provided to a participant in an online content-sharing session via an Instant Messenger (IM) service. The plug-in module may be a part of an IM application running on the participant's system or the host module may transmit a self-installing plug-in module to the participant's system upon receiving an indication that a user is hosting the online session. The plug-in module provides kernel-specific interface of the participant system's Operating System (OS) to the host module, which, then sends an OS-specific instruction to the plug-in module to trigger the OS to disable or control the copying of the streaming content as specified in a privacy preference received from the user hosting the online session. In this manner, sensitive and critical business data may be conveniently and securely shared online.

19 Claims, 2 Drawing Sheets

(56) References Cited

U.S. PATENT DOCUMENTS

| | | | |
|---|---|---|---|
| 2010/0287543 A1* | 11/2010 | Wehkamp | G06F 9/5072 |
| | | | 717/171 |
| 2010/0293541 A1* | 11/2010 | Pall | G06F 8/61 |
| | | | 717/178 |
| 2012/0117611 A1* | 5/2012 | Wookey | G06F 21/10 |
| | | | 726/1 |
| 2013/0145246 A1* | 6/2013 | So | G06Q 10/10 |
| | | | 715/224 |
| 2016/0070812 A1* | 3/2016 | Murphy | H04L 67/02 |
| | | | 707/608 |
| 2017/0264614 A1* | 9/2017 | Huang | G06F 21/6245 |
| 2018/0167674 A1* | 6/2018 | Shadrin | G06F 21/16 |

* cited by examiner

DATA PRIVACY PLUG-IN FOR ENTERPRISE INSTANT MESSAGING PLATFORM

TECHNICAL FIELD

This disclosure relates generally to online instant messaging and, more particularly, to a plug-in module based prevention of unauthorized copying of the data sent to a participant in an online content-sharing session via an Instant Messenger (IM) service.

BACKGROUND

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems include many different types of consumer and commercial electronic devices such as, for example, personal computers (e.g., desktops or laptops), tablet computers, mobile devices (e.g., personal digital assistants (PDAs) or smartphones), corporate (or small business) server and data processing systems, network storage devices, and the like. These devices or systems may vary in size, shape, performance, functionality, and price. In any event, almost all of these modern devices are equipped with relevant hardware and software to allow their users to access the Internet to perform various online activities such as, for example, browsing different websites, carrying out online business transactions, playing online games, participating in online meetings or chat sessions, and so on.

Businesses and enterprises today use a variety of Instant Messenger (IM) services to exchange corporate data, financial information, and other sensitive digital content during an online content-sharing session among a group of corporate participants. Some exemplary instant messaging platforms or IM services include the Skype® application by Microsoft®, the BigAnt office messenger for internal corporate communication, the Bopup client/server instant messaging system, and the like. These IM platforms facilitate online data exchange (including content streaming) among different information handling systems of the participants.

SUMMARY

This Summary provides a simplified form of concepts that are further described below in the Detailed Description. This Summary is not intended to identify key or essential features and should therefore not be used for determining or limiting the scope of the claimed subject matter.

In the context of IM-based online content-sharing among participants using different information handling systems, the present disclosure relates to using a plug-in module to prevent unauthorized copying of the data sent to a participant in an online content-sharing session via an IM service. The plug-in module may be based on a trampoline function and may prevent unauthorized copying—such as, for example, screen captures, screenshots, or screen recordings—of the streaming content provided to the participants of the IM-based online content-sharing session. The streaming content may include critical corporate information such as, for example, corporate financial data, data associated with sensitive internal corporate meetings, important business presentations subject to intellectual property rights, or other protected digital content like data containing Personally Identifying Information (PII) of business personnel, and the like. The plug-in module may operate in a client-server configuration in conjunction with a corresponding host module, which may transmit the plug-in module to the information handling systems of the participants upon receiving an indication from a user that the user is hosting an online content-sharing session to provide streaming content to the participants. The plug-in module may self-install in the information handling systems of the participants and may delete itself from the participant systems upon conclusion of the online session. On the other hand, the plug-in module may be provided through software distribution as part of the IM software. The plug-in module may provide kernel-specific interface of each participant system's Operating System (OS) to the host module, which, in turn, may send to the plug-in module an OS-specific instruction for the OS of each participant system to trigger the corresponding OS to disable copying of the streaming content or to control/allow the copying as specified in a privacy preference received from the user hosting the online session. In this manner, sensitive and critical business data may be conveniently and securely shared online using an IM platform.

In one embodiment, the present disclosure is directed to a method, which comprises: (i) receiving, by a first computing system, an indication that a first user is hosting an online content-sharing session to provide a streaming content to a second user at a second computing system; (ii) further receiving, by the first computing system, a privacy preference from the first user specifying an extent to which the second user is to be prevented from copying the streaming content using the second computing system; and (iii) instructing, by the first computing system, a plug-in module running in the second computing system to prevent a software executing in the second computing system from allowing the second user to copy the streaming content in violation of the privacy preference. As noted before, the online content-sharing session may be hosted using an IM service. The software executing in the second computing system may include the OS of the second computing system or an application (for example, an instant messaging application) running on the second computing system. The plug-in module may be a part of the IM application running on the second computing system. Alternatively, the first computing system may transmit the plug-in module to the second computing system, and the plug-in module may be operable to self-install in the second computing system.

In another embodiment, the present disclosure is directed to a computing system, which comprises: a memory storing program instructions; and a processing unit coupled to the memory and operable to execute the program instructions. In the computing system, the program instructions, when executed by the processing unit, cause the computing system to: (i) receive an indication that a first user is hosting an online content-sharing session to provide a streaming content to a second user at a client system; (ii) further receive a privacy preference from the first user specifying an extent to which the second user is to be prevented from copying the streaming content using the client system; and (iii) instruct a plug-in module running in the client system to prevent a software executing in the client system from allowing the second user to copy the streaming content in violation of the privacy preference.

In a further embodiment, the present disclosure is directed to a computer program product comprising a non-transitory computer-usable medium having computer-readable program code embodied therein, wherein the computer-readable program code is adapted to be executed by a first computing system to implement a method. The method comprises: (i) receiving an indication that a first user is hosting an online content-sharing session to provide a streaming content to a second user at a second computing system; (ii) further receiving a privacy preference from the first user specifying an extent to which the second user is to be prevented from copying the streaming content using the second computing system; and (iii) instructing a plug-in module running in the second computing system to prevent a software executing in the second computing system from allowing the second user to copy the streaming content in violation of the privacy preference.

The combination of the plug-in module and its host module may comprise a Data Privacy (DP) application that provides protections against unauthorized copying of the streaming content shared through an IM platform. Many times in online corporate meetings, it may be inevitable to show or demonstrate critical enterprise information that is subject to intellectual property rights or that contains protected/sensitive digital content. The DP application may trigger the OS of a participant's information handling system to prevent screen capture, screen sharing, or recording of the streaming content of an IM-based online meeting. If the conductor or host of the online meeting wishes to allow one or more of the participants to copy some or all of the streaming content, the DP application may facilitate such controlled copying as well. The prevention of data theft in this manner bolsters the security of the sensitive enterprise data, especially when the data are shared online among multiple participants via instant messaging.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

DETAILED DESCRIPTION

Figure 1:
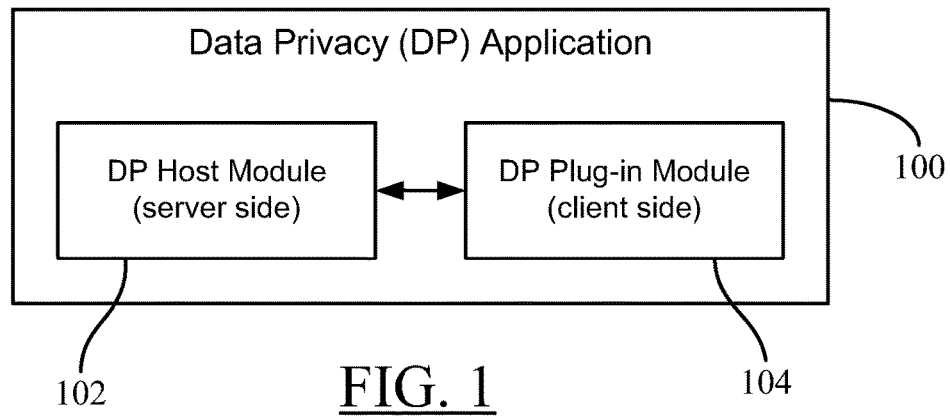
FIG. 1 illustrates constituent components of a Data Privacy (DP) application according to an exemplary embodiment of the present disclosure.

For purpose of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smartphone), server (e.g., blade server or rack server), a network storage device (or database), a network controller, or any other suitable device, and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touch-screen and/or video display. The information handling system may also include one or more buses operable to transmit communications between the various hardware components.

It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism. Furthermore, a hyphenated term (e.g., "content-sharing," "user-specific", "computer-readable", etc.) may be occasionally interchangeably used with its non-hyphenated version (e.g., "content sharing," "user specific," "computer readable", etc.), and a capitalized entry (e.g., "Host Module", "Client System," "Operating System", etc.) may be interchangeably used with its non-capitalized version (e.g., "host module," "client system," "operating system", etc.). Such occasional interchangeable uses shall not be considered inconsistent with each other.

As mentioned before, businesses and enterprises today use a variety of IM services to exchange confidential and sensitive corporate data during an online content-sharing session among a group of corporate participants. Many times it may be inevitable to share such content, whereas, at some other times, the protected digital content may be inadvertently sent to the participants in an online meeting. Current IM platforms do not have a way to prevent viewers from capturing screenshots or making video recordings of the streaming digital content using their information handling systems. Even when the content is marked with the legend "Do Not Copy," the IM services do not have a mechanism to prevent data copying by the recipients. Because some or all of the shared data may be subject to various intellectual property rights or may contain personally-identifying information of corporate personnel or other protected digital content, such lack of data security afforded by existing IM platforms may expose corporate data to theft or misuse. Indeed, lack of security for corporate data shared online is a key cause of billions of dollars worth of data theft in the industry today.

Although digital watermarking—such as, for example, displaying a persistent watermark in the streaming content—may be used as a solution to protect data privacy and security, this solution has its limitations. The watermark merely provides a notice to the recipient user of the protected nature of the content; it does not prevent the user from copying the content. For example, even when the watermarked content is sent to a user's computer, the watermark does not prevent the user from using alternate means—such as, for example, a mobile phone, a separate camera, or a tablet computer—to copy the data being displayed on the user's computer. Furthermore, if the user wishes, the user can still record the content or capture screenshots of the content with watermark using the same computer that is receiving the watermarked content.

It is therefore desirable to devise a methodology to provide the needed privacy and security for the corporate data being exchanged/shared in an online session via an IM service. In that regard, it is desirable that the data protection methodology prevents unauthorized copying of the shared data through screen capture or recording (with the participant's device receiving the streaming content), while allowing the host of the online session to dictate participant-specific and/or content-specific privacy preference for the data so that the host may selectively authorize a participant to copy all or a host-approved portion of the streaming content.

The present disclosure relates to providing data security and protecting data privacy in an IM-based online meeting or content-sharing session by using a plug-in module to prevent unauthorized copying of the data sent to each participant. The plug-in module may be based on a trampoline function. The plug-in module may operate in a client-server configuration in conjunction with a corresponding host module. The plug-in module already may be a part of the IM software running on the participant's system, or the host module may transmit the plug-in module to the system or device of the participants upon receiving an indication from a user that the user is hosting an online content-sharing session to provide streaming content to the participants. The combination of the plug-in module and its host module may comprise a Data Privacy (DP) application that provides protections against unauthorized copying of the streaming content shared through an IM platform. The DP application may trigger the Operating System (OS) of a participant's system/device to prevent screen capture, screen sharing, or recording of the streaming content through the OS itself or through another software (for example, an instant messaging application) running on the participant's system. If the plug-in module is transmitted by the host module, the plug-in module may self-install in the information handling systems of the participants. The plug-in module may provide kernel-specific interface of each participant system's OS to the host module, which, in turn, may send to the plug-in module an OS-specific instruction for the OS of each participant system to trigger the corresponding OS to disable copying of the streaming content or to control/allow the copying as specified in a privacy preference received from the user hosting the online session. In this manner, sensitive and critical business data may be conveniently and securely shared online using an IM platform.

FIG. 1 illustrates constituent components of a Data Privacy (DP) application 100 according to an exemplary embodiment of the present disclosure. The DP application 100 may be a software module having various distributed data processing functionalities discussed later below with reference to FIGS. 2-3. The DP application 100 according to particular embodiments of the present disclosure may comprise a DP host module 102 (simply, the "host module") 102 and a DP plug-in module 104 (simply, the "plug-in module" or the "DPP module"). Some portion of data processing or computations may be performed locally in a server system (or a system associated with a user hosting an online content-sharing session) whereas some other portion of data processing may be performed on a client system (for example, an information handling system of a participant or attendee in an IM-based online conference). The program code of the host module 102 may be executed in the server system (such as the server 302 in FIG. 3), whereas the program code of the plug-in module 104 may be executed in each client system (such as the client systems 304-305 in FIG. 3). The host module 102 and the DPP module 104 may be in bi-directional communication with each other via a communication network (as discussed below with reference to FIG. 3), and may together provide the data privacy and security functionality for the digital content exchanged through an IM platform as discussed later below. In particular embodiments, the program code of the DPP module 104 may be based on a trampoline function to prevent screen capture and screen recording on computing devices such as laptops, desktops, mobile devices (such as tablets and smartphones), and the like. The trampoline behavior may restrict the OS or other application running on a client system from allowing unauthorized copying of content being streamed through the IM service.

In particular embodiments, the program code of the DP application 100, upon execution by a processor in an information handling system (such as the processor 402 in the server system 302 in FIG. 4) may cause the information handling system to perform various operational tasks discussed below with reference to FIGS. 2-3. The information handling system may be owned or operated by a corporate entity or an online business unit of the corporate entity desirous of deploying the DP application 100 for online data privacy and security as per teachings of the present disclosure. At run time, the DP application 100 may monitor the privacy preference (or security settings) of the user hosting an online content-sharing session via an IM platform and provide data security as per the user's privacy preference, as discussed in more detail with reference to FIG. 3. It is noted here that although the discussion given below is primarily with reference to protection of corporate data delivered through an IM platform, the teachings of the present disclosure remain applicable to an IM-based online content-sharing session in a non-corporate environment as well. For example, an IM service provider itself may offer a fee-based premium service to its non-corporate users allowing them to avail of the premium functionality of data protection as per teachings of the present disclosure during their IM chat sessions or meetings. For the sake of brevity, such non-corporate implementations are not discussed here.

Figure 2:
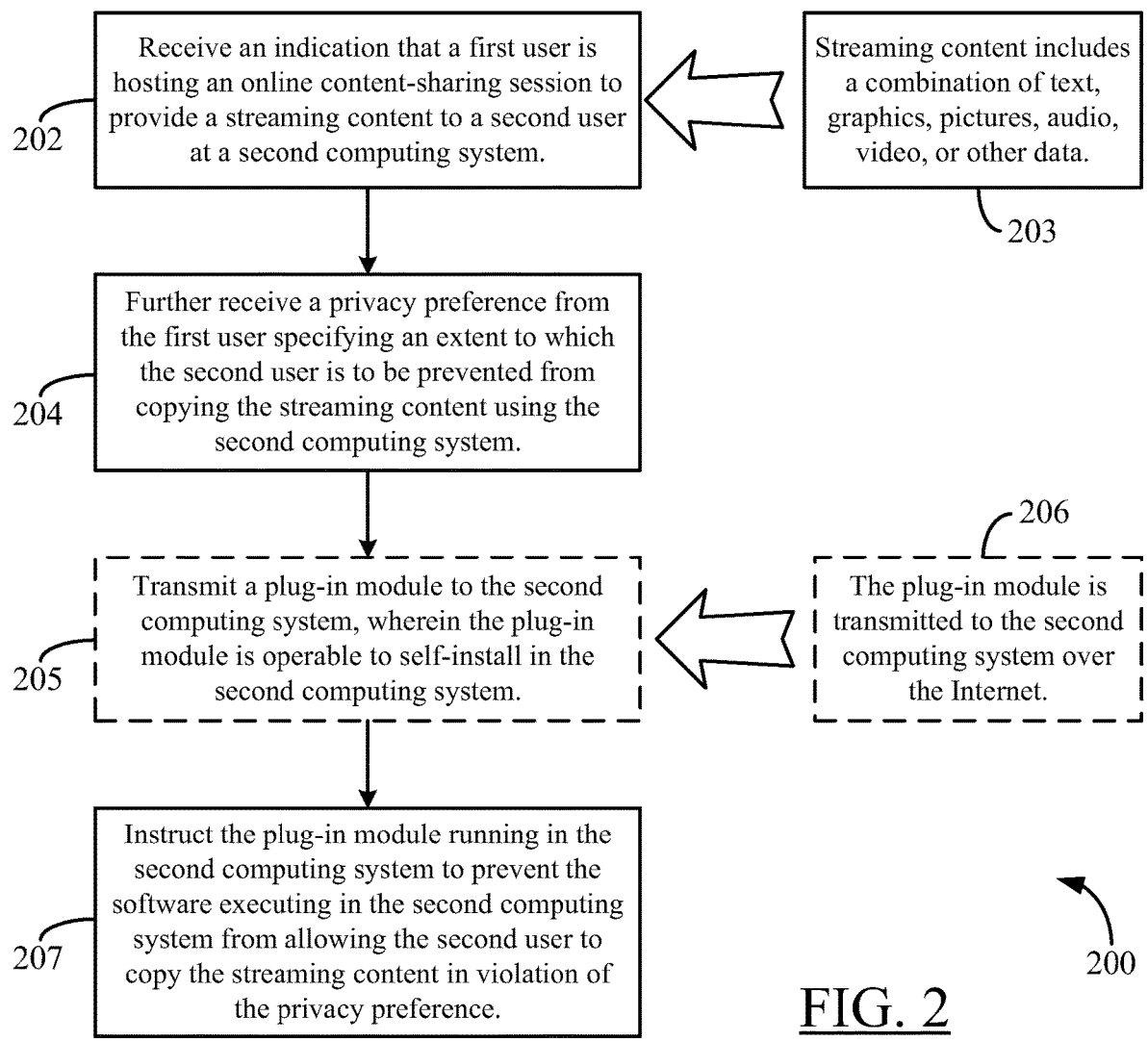
FIG. 2 is an exemplary flowchart depicting various steps that may be performed by a computing system as per particular embodiments of the present disclosure to carry out online data security using the data privacy application of FIG. 1.

FIG. 2 is an exemplary flowchart 200 depicting various steps that may be performed by a computing system as per particular embodiments of the present disclosure to carry out online data security using the data privacy application 100 of FIG. 1. In one embodiment, the computing system may be the system 302 shown in FIGS. 3-4 and discussed later below. More generally, the computing system performing the steps shown in FIG. 2 may include in hardware and/or software the functionality of DP application 100. In one embodiment, the program code for the DP application 100 (and other relevant program code such as the program code for an operating system managing the execution of the DP application) may be executed by a processor (such as the processor 402 in FIG. 4) in the computing system, and, upon execution of the program code, the computing system may be operative to perform the tasks illustrated in FIG. 2.

In the flowchart 200, each block represents one or more tasks that can be implemented in hardware, software, or a combination thereof. In the context of software, the blocks represent computer-executable instructions that, when executed by one or more processors in a computing environment, cause the processors to perform the recited tasks. Generally, computer-executable instructions include routines, programs, objects, modules, components, data structures, and the like that perform particular functions or implement particular abstract data types. The order in which the blocks are described is not intended to be construed as a limitation, and any number of the described tasks can be combined in any order and/or in parallel to implement the process shown in the flowchart 200. For discussion purpose, the process in the flowchart 200 is described with reference to FIGS. 3-4 (discussed later below), although other models, frameworks, systems and environments may be used to implement this process.

Figure 3:
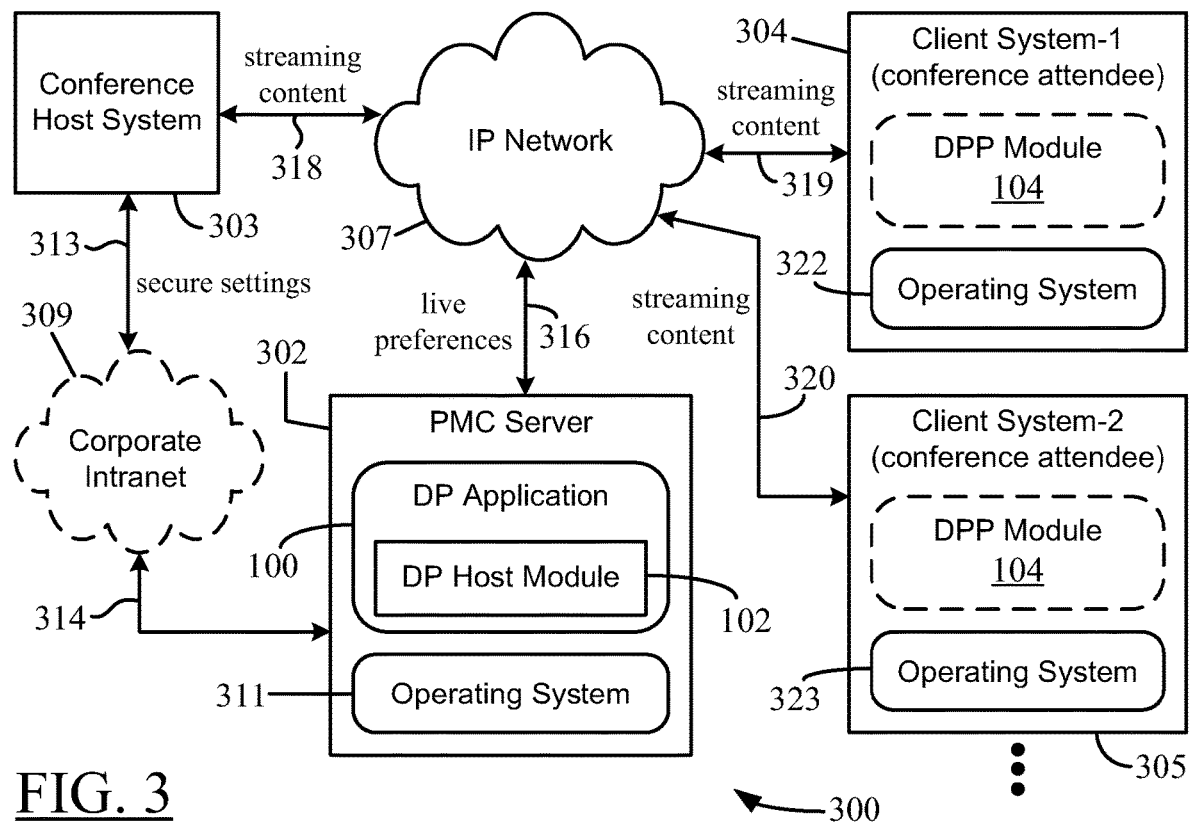
FIG. 3 is an exemplary arrangement as per particular embodiments of the present disclosure to protect data privacy during an IM-based online content-sharing session.

Initially, as noted at block 202, the computing system (for example, the server 302 in FIGS. 3-4) may receive an indication that a first user is hosting an online content-sharing session to provide a streaming content to a second user at a second, different computing system (such as the client system 304 or 305 in FIG. 3). The second user may be a participant in the online session being hosted by the first user. The indication at block 202 may be received from a human user who may manually input the indication into the computing system (here, the server 302) or may electronically send the indication (for example, from a different source) to the computing system (here, the server 302) that the user is ready to commence an online corporate meeting (or content-sharing session) using a specific IM service. The streaming content may be provided using the IM service and, as noted at block 203, the streaming content may include a combination of text data, graphics data, pictures or other visual content, audio data, video data, or other data (for example, a binary file). During an online corporate meeting, sensitive data may be streamed in the form of PowerPoint® slides, as pages of a Portable Document Format (PDF) document, or in any other suitable file format.

As noted at block 204, the computing system (here, the server 302) also may receive a privacy preference from the first user specifying an extent to which the second user is to be prevented from copying the streaming content using the second computing system (such as the client system 304 or 305). Some examples of privacy preferences that may be provided by the user hosting the online IM session are given later with reference to discussion of FIG. 3. In some embodiments, before the first user commences the online session (which may involve streaming of sensitive corporate data), the computing system/server may transmit a plug-in module (such as, for example, the DPP module 104) to the second (client) computing system (block 205). In some embodiments, the plug-in module may be transmitted to the second computing system over the Internet (block 206). The plug-in module may be a self-installing executable file. In other words, the plug-in module is operable to self-install (or auto-execute) in the second computing system. The blocks 205-206 are shown dotted because the transmission aspect at blocks 205-206 may be optional. In some embodiments, the plug-in module may be distributed as part of the IM software installed in the second computing system, in which case, there may be no need to transmit the plug-in module as noted at blocks 205-206. As noted at block 207, the (server) computing system (or, more specifically, the DP host module 102 in the server system) may instruct the plug-in module running in the second (client) computing system—whether as part of the IM software or as a self-installing program code transmitted at blocks 205-206—to prevent the software executing in the second computing system from allowing the second user—that is, the non-host participant in the online IM session—to copy the streaming content in violation of the privacy preference (received from the first user hosting the IM session, as noted at block 204). As mentioned before, the software executing in the second computing system may include the OS of the second computing system or an application (for example, an instant messaging application) running on the second computing system. In this manner, sensitive and critical business data may be conveniently and securely shared online using an IM platform.

FIG. 3 is an exemplary arrangement 300 as per particular embodiments of the present disclosure to protect data privacy during an IM-based online content-sharing session. In the arrangement 300, a Preference Management Center (PMC) server 302 is shown to be communicatively connected to a conference host system 303, a first client system 304, and a second client system 305 via a communication network 307. The communication network 307 may facilitate communication among these entities including, for example, delivery of the streaming content from the host 303 to the clients 304-305, transmission of the plug-in module 104 from the server 302 to the clients 304-305 (if necessary), and so on. In the embodiment of FIG. 3, the communication network 307 is an Internet Protocol (IP) network, such as the Internet. In other embodiments, the communication network 307 may include a voice network, a data network, or both, or may include, for example, a cellular network, a Local Area Network (LAN), a Public Land Mobile Network (PLMN), and the like, or a combination of two or more such networks. It is observed here that, in particular embodiments, one or more of the systems/devices 302-305 may be coupled to other networks via a wired or wireless connection (whether circuit-switched or packet-switched). For example, in some embodiments, the host system 303 may communicate with the PMC server 302 exclusively via a corporate intranet 309, and not through the IP network 307. In other embodiments, the host system 303 may use a combination of the corporate intranet 309 and the Internet 307 to communicate with the PMC server 302. Because of its optional nature, the corporate intranet 309 is shown dotted in FIG. 3.

The host system 303 may be an information handling system (such as, for example, a laptop or desktop computer, a tablet, or a smartphone) operated or managed by the user (for example, a corporate employee, management staff member, or the like) hosting the IM-based online conference or content-sharing session. The client systems 304, 305, on the other hand, refer to the information handling systems (like laptop or desktop computers, tablets, or smartphones)

operated by, associated with, or managed by the conference attendees or participants (for example, corporate employees, staff at a vendor facility, company suppliers, and so on). For simplicity of the drawing, only two client systems 304, 305 are shown in FIG. 3. However, it is understood that there may be only one or multiple participants in the online conference. Similarly, also for the simplicity of the drawing, only the relevant architectural details of the entities 302-305 are shown in FIG. 3. In other words, all different information handling systems related to the configuration 300 in FIG. 3 may be networked or communicatively connected to one another as required to implement the data protection methodology as per teachings of the present disclosure. The architectural details of interconnections among the entities in FIG. 3, detailed hardware configurations of each such entity, or the network topology of communication among these entities are not relevant to the present disclosure and, hence, such details are not shown in FIG. 3 and additional discussion thereof is not provided here for the sake of brevity.

It is noted here that the terms "server" and "client" are used herein for ease of discussion and to more clearly explain the execution of the DPP module 104 and its interaction with the host module 102. However, this usage does not necessarily imply that the client-server based model discussed in FIG. 3 is the only way to implement the functionality of the DP application 100 as per teachings of the present disclosure. Furthermore, in certain aspects, the PMC server 302 may function as a "server," whereas in some other respects, it may not function as a server. Similarly, in certain aspects, the systems 304-305 may function as "clients" of the server 302, whereas in some other respects, they may not function as client systems.

In certain embodiments, the PMC server 302 may be a centralized system dedicated to run the DP application 100 and provide enterprise-wide data security to all online conferences hosted by multiple different host systems—one of which is the system 303. Each such host system may "report" its online IM session to the server 302 to enable the server 302 to provide the requisite support for the host-specific streaming content. In other embodiments, the PMC server 302 may be absent. Rather, the DP application 100 may be deployed in each host system (such as the system 303) to provide the data security. In other words, each host system itself may incorporate the functionality of the PMC server 302. In the embodiment of FIG. 3, the DP application 100 is shown to reside in a separate PMC server (here, the server 302) and executed by a processor (such as the processor 402 in FIG. 4) in the server 302. More specifically, in some embodiments, the host module 102 of the DP application 100 may be executed by the processor under operative control of the server's operating system (OS) 311 (e.g., Windows™, Mac™ OSX, Linux, etc.). The server's processor may execute its OS 311 as well.

The server 302 may be an information handling system operated, accessed, or managed by a corporate entity supporting the hosting of IM-based online conferences by its employees, affiliates, or other staff members. In a non-corporate environment, for example, the server 302 may be associated with an IM service provider that offers a fee-based data privacy service to its subscribers. The server 302 may be a stand-alone system or part of another information handling system or a group of computing systems. The architectural details of different possible implementations of the functionality of the PMC server 302 are not relevant to the present disclosure and, hence, such details are not provided here for the sake of brevity.

In particular embodiments, when the user of the host system 303 wishes to initiate an IM chat session with the participants at client systems 304-305 that may involve sharing of sensitive corporate data, the user may send an indication to the PMC server 302 that the user is preparing to host an online content-sharing session to provide streaming content via an IM platform. For example, such indication may include user's corporate employee ID (if applicable), the date and time/duration of IM chat session, the name of IM service provider (or IM platform), any available information identifying the participants (such as, for example, the employee IDs or e-mail IDs of the participants, or the IM service-specific user_IDs of the participants), and/or other information specified by the corporate entity managing the PMC server 302. In one embodiment, the user may manually input such indication into an appropriate form or data field displayed on a screen (not shown) of the PMC server 302. In another embodiment, the user may use the host system 303 to electronically transmit such indication to the PMC server 302 via the corporate intranet 309, as indicated at arrows 313-314 in FIG. 3. In the absence of the intranet 309, the host system 303 may send the indication to the server 302 via the IP network 307. Additionally, the user hosting the IM session also may provide a privacy preference input (at arrows 313-314 or via the IP network 307) to the PMC server 302 specifying the extent to which each participant (at client systems 304-305) is to be prevented from copying the streaming content using the respective client system 304, 305. In some embodiments, the privacy preference may be participant-specific in the sense that different restrictions may be specified for different participants. In other words, the host can provide copy authorizations on per attendee basis. For example, one privacy preference may be specified for the participant at the client system 304, whereas a different privacy preference may be specified for the participant at the client system 305.

In one embodiment, the privacy preference may be sent to the PMC server 302 by the user of the host system 303 only once—for example, prior to the commencement of the IM-based online content-sharing session. In another embodiment, the privacy preference may be sent to the PMC server 302 more than once throughout the online content-sharing session. For example, the host user may wish to alter, amend, activate, or cancel a privacy preference at run-time. In that case, the user may provide such run-time changes to the PMC server 302 during the content-sharing session as illustrated, for example, by the arrow 316 in FIG. 3. In some embodiments, the DP application 100 in the PMC server 302 may facilitate such user level access controls through a preference management feature that the user may access through the host system 303.

Below are some exemplary privacy preferences, one of which may be provided (by the user of the host system 303) to the PMC server 302 for each participant: (i) an input that indicates that a participant be allowed (e.g., given permission) to copy all of the streaming content, (ii) an input that indicates that the participant be allowed to copy none of the streaming content, (iii) an input that indicates a start point and an end point of a portion in the IM session during which the participant be allowed to copy the corresponding portion of the streamed content (such as, for example, the content streamed after the host indicates conclusion of the first half of the online session, or the content sent between the start of the 7th minute of the session and the end of the 12th minute of the session, and so on), and (iv) an input that specifically identifies one or more portions in the streaming content that the participant be allowed to copy (such as, for example, slide 7 of the host's PowerPoint® presentation, or every fifth slide of the presentation, or page 4 of the host's PDF file, and so on). In certain embodiments, the DP host module 102 may communicate the host user's initial preferences or any run-time changes thereto with each DPP module 104 installed at the client system to enable the DPP module 104 to implement the privacy preference of the host user, as discussed in more detail below. In FIG. 3, the delivery of the streaming content by the host user is illustrated by arrow 318 and the receipt of the streaming content by the participants at client systems 304-305 is illustrated by arrows 319-320, respectively.

In particular embodiments, the plug-in module (the DPP module) 104 may be already present or installed in each client system 304-305 through software distribution. For example, the DPP module 104 may be a part of the IM software or IM application downloaded on or otherwise distributed to each client system 304-305. In other words, the IM software or IM application may itself contain the plug-in module 104, for example, as a Dynamic Linked Library (DLL) file or a binary file. Alternatively, in other embodiments, upon receiving the indication of the upcoming IM-based online content-sharing session and/or the session-specific privacy preference(s) from the user of the host system 303, the DP host module 102 of the DP application 100 (running on the PMC server 302) may transmit the plug-in module 104 to each participant's client system 304, 305 over the IP network 307. More generally, it is preferable that the DP host module 102 send the plug-in module 104 to each client system 304-305 prior to the delivery of any streaming content (from the host system 303) to any of the client systems 304-305. The transmitted version of the plug-in module 104 may be a self-installing executable file. The DPP module 104 may self-install in each client system 304-305 under operative control of the respective OS 322-323, and may delete itself from the client systems 304-305 upon conclusion of the online IM session. As a result of two available options to provide each client system 304-305 with a corresponding plug-in module, the plug-in module 104 inside each client system 304-305 is illustrated by a dotted block.

The DP host module 102 may remain in communication with each client-based DPP module 104 via the IP network 307 and instruct each DPP module 104 to prevent the software executing in the respective client system 304-305 from allowing the client system-based conference participant/attendee to use the corresponding client system to copy the received streaming content (at arrows 319 or 320, whichever is applicable) in violation of the privacy preference of the user of the host system 303, as discussed in more detail below. As mentioned before, the software executing in the client systems 304-305 may include the respective OS 322-323 or another application (for example, an instant messaging application) running on a client system 304-305.

More specifically, in some embodiments, the DPP module 104—whether distributed as part of an IM software or transmitted by the host module 102—may be executed by a processor (not shown) in the client system 304, 305 under operative control of the respective OS 322, 323 (e.g., Windows™, Mac™ OSX, Linux, etc.). If any of the client systems 304-305 is a mobile system (such as, for example, a tablet computer, a smartphone, a User Equipment (UE), and the like), the corresponding OS 322, 323 may be a mobile operating system (or mobile OS) (e.g., Symbian™ OS, Palm™ OS, Windows Mobile™, Android™, Apple iOS™, etc.).

In particular embodiments, the program code of the DPP module 104 may be based on a trampoline function to prevent screen capture and screen recording on the client systems 304-305. The trampoline behavior may restrict the software (the client system's OS or other application) running on the client systems 304-305 from allowing unauthorized copying of the content being streamed through the IM service. In certain embodiments, upon execution, the DPP module 104 may provide kernel-specific interface of each participant system's OS 322, 323 to the host module 102. As is known, an OS kernel is a central component of a computer system and is responsible for running and executing programs by facilitating interactions between system hardware and various software components (or different applications like browsers, word processors, or audio/video players running on the system). A kernel connects the application software to the hardware of a computer. Therefore, kernel-specific interface of an OS may provide a guide as to how to prevent an unauthorized copying of the streamed content by disabling a software's access to the requisite hardware resource(s) when the software (such as the client OS 322-323 or other application running on the client systems 304-305) attempts to copy/record the content in violation of the host user's privacy preference.

For example, the kernel-specific interface of the OS 322 may be analyzed by the host module 102 (in view of the participant-specific privacy preference received from the user of the host system 303) to determine an OS-specific instruction for the OS 322 that would trigger the OS 322 to disable copying of the streaming content (at arrow 319) or to control/allow (e.g., permit) the copying as specified in the privacy preference received from the user hosting the online session. The host module 102 may send the OS-specific instruction to the DPP module 104 running on the client system 304 to enable the plug-in module 104 to interact with the OS 322 to implement the privacy preference of the host user. In some embodiments, the participant-specific privacy preference also may be sent to the respective client system 304-305 to "activate" the screen capture disabling or other similar privacy protection functionality of the corresponding plug-in module 104. Therefore, for example, when the participant at the client system 304 attempts to use a software in the client system 304 (such as the OS 322 or any other application) to record or take screen shots of a portion of the streamed content and save them, for example, in the client system's memory or other peripheral storage device (such as a Universal Serial Bus (USB) drive) (not shown) against the host's privacy preference submitted to the DP host module 102 (and, preferably, also sent to the plug-in module 104), the OS-specific instruction (from the DPP module 104) may trigger the OS 322 to prevent such copying. A similar procedure to prevent unauthorized screen capture, screen shot, screen recording, or other type of content-copying may be implemented at the client system 305 in response to the host module's 102 receipt of the kernel-specific interface of the OS 323 from the DPP module 104 executing in the client system 305. In this manner, sensitive and critical business data may be conveniently and securely shared online using an IM platform.

In some embodiments, in addition to the above-discussed approach of preventing the software of a participant's system from allowing the participant to use the system's hardware to make an unauthorized copy of the content being streamed via an IM session, the DP application 100 also may facilitate insertion of a digital watermark into the streaming content being delivered to the client systems 304-305 to impose a secure watermark on the captured image or recorded content when the participant uses an alternate device (that is, a device other than the corresponding client system 304-305) to record or capture the content being displayed on the screen (not shown) of the participant's system 304-305. For example, the watermark may be one of the following: (i) a watermark that is persistently displayed throughout the content-sharing session, or (ii) a watermark that is intermittently (for example, at pre-determined time intervals or randomly) displayed during the content-sharing session, or (iii) a watermark that is dynamically displayed during the content-sharing session based on the sensitivity of the streaming content. In case of the dynamically-displayed watermark, the user of the host system 303 may be allowed to specify or designate to the DP host module 102 in advance which portion(s) of the shared content is/are sensitive enough to warrant insertion of a watermark. As a result, the DP host module 102 may time the insertion of the watermark dynamically into the streaming content based on the higher sensitivity of the corresponding content. Other types of watermarks also may be devised and inserted as desired. In one embodiment, the host module 102 may instruct the plug-in module 104 in each client system 304-305 to insert such a watermark into the streaming content received by the client system. In another embodiment, the host module 102 may communicate with the host system 303 and instruct the host system 303 to insert the appropriate watermark(s) before the content is streamed using an IM application.

Thus, the combination of the plug-in module 104 and its host module 102 may provide protections against unauthorized copying of the streaming content shared through an IM platform. Many times in online corporate meetings, it may be inevitable to show or demonstrate critical enterprise information that is subject to intellectual property rights or that contains protected/sensitive digital content. The DP application 100 may prevent screen capture, screen sharing, or recording of the streaming content of an IM-based online meeting. If the conductor or host of the online meeting wishes to allow (e.g., provide permission to) one or more of the participants to copy some or all of the streaming content, the DP application may facilitate such controlled copying as well. The prevention of data theft in this manner bolsters the security of the sensitive enterprise data, especially when the data are shared online among multiple participants via instant messaging.

Figure 4:
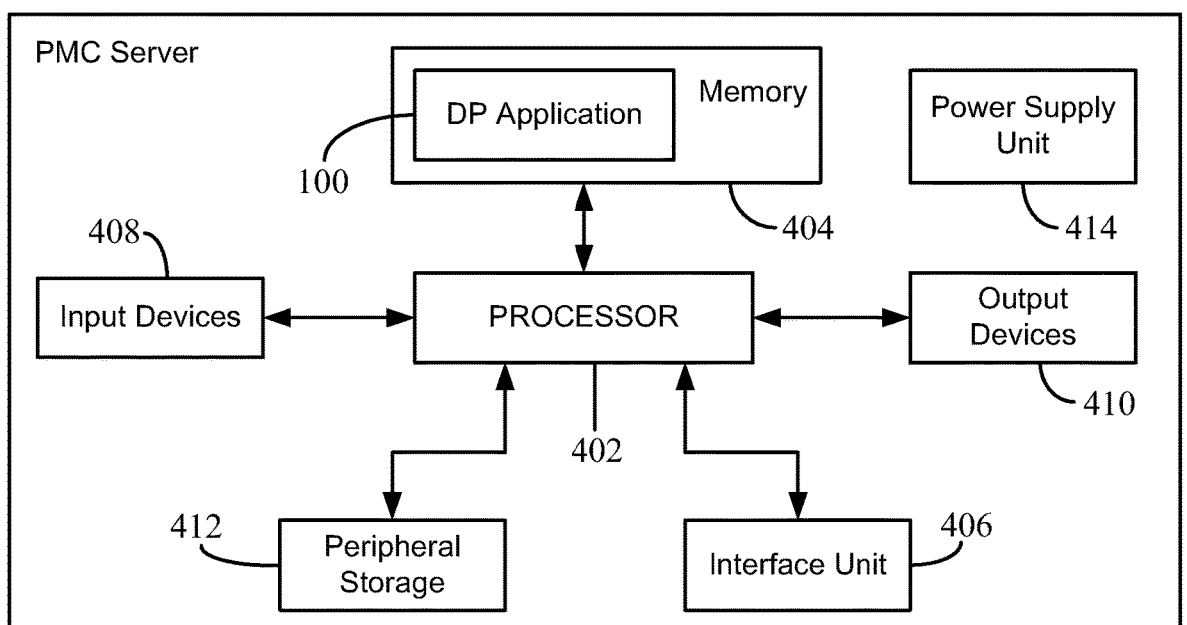
FIG. 4 illustrates an example configuration of a computer system that can be used to implement the online data security methodology described herein.

FIG. 4 illustrates an example configuration of a computer system (here, the PMC server 302) that can be used to implement the online data security methodology described herein. In particular embodiments, as discussed earlier, the DP application 100 may be used to implement the data security of the content streamed online using an IM platform as per teachings of the present disclosure. The computer system (or computing device) 302 may be suitably configured to implement the functionality of the DP application 100. The computer system 302 may include one or more processors 402, a memory unit 404, an interface unit 406 providing communication interfaces, one or more input devices 408, one or more output devices 410, and a peripheral storage unit 412, connected to the processor 402 as shown and configured to communicate with each other, such as via one or more system buses (not shown) or other suitable connection. In some embodiments, the computer system 302 may be an information-handling system mentioned before.

In one embodiment, the input devices 408 may provide user inputs—for example, any inputs manually provided into the computer system 302 by the user of the host system 303—to the processor 402 and the DP application 100 for further processing as per teachings of the present disclosure. In some embodiments, such inputs may include the privacy preference(s) and other indication(s) noted at blocks 202, 204 (FIG. 2). The input devices 408 may include, for example, a touchpad, a camera, a computer keyboard, a touch-screen, a joystick, a physical or virtual "clickable button" (such as, for example, on an online web page), a computer mouse/pointing device, and the like. In some embodiments, an input device 408 may be an Application Program Interface (API) along with a virtually clickable page or, more simply, a virtual click (or other content selection mechanism) to allow a user to provide user inputs. A display screen is an example of the output device 410. Other examples of an output device include a graphics/display device, a computer screen or monitor, an alarm system, or any other type of data output device. In some embodiments, the input device(s) 408 and the output device (s) 410 may be coupled to the processor 402 via an I/O or peripheral interface(s). In some embodiments, the computer system 302 may include more than one instance of the devices shown. In various embodiments, all of the components shown in FIG. 4 may be housed within a single housing. In other embodiments, the computer system 302 may not include all of the components shown in FIG. 4. Furthermore, the computing device 302 may be configured as a standalone system, as a server system, as a client system, or in any other suitable form factor.

The processor 402 is a hardware device that may include a single processing unit or a number of processing units, all of which may include single or multiple computing units or multiple cores. When the computing device 302 is a multi-processor system, there may be more than one instance of the processor 402 or there may be multiple processors coupled to the processor 402 via their respective interfaces (not shown). The processor 402 may include an integrated Graphics Processing Unit (GPU) or the GPU may be a separate processor device in the system 302. The processor 402 may be implemented as one or more microprocessors, microcomputers, microcontrollers, Digital Signal Processors (DSPs), Central Processing Units (CPUs), Graphics Processing Units (GPUs), state machines, logic circuitries, and/or any devices that manipulate signals based on operational instructions. Among other capabilities, the processor 402 may be configured to fetch and execute computer-readable instructions stored in the memory 404, the peripheral storage 412, or other computer-readable media. In some embodiments, the processor 402 may be a System on Chip (SoC).

The memory 404 and the peripheral storage unit 412 are examples of non-transitory computer media (e.g., memory storage devices) for storing instructions that can be executed by the processor 402 to perform the various functions described herein. For example, the memory unit 404 may include both volatile memory and non-volatile memory (e.g., RAM, ROM, or the like) devices. Further, in particular embodiments, the peripheral storage unit 412 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices constituting the peripheral storage 412 may be collectively referred to as memory or computer storage media herein, and may be a media capable of storing computer-readable, processor-executable program instructions as computer program code that can be executed by the processor 402 as a particular machine configured for carrying out the operations and functions described in the implementations herein.

The computing device 302 may also include one or more communication interfaces as part of its interface unit 406 for exchanging data via a network (such as the networks 307 and 309 shown in FIG. 3). The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), the Internet, an intranet, and the like. Communication interfaces in the interface unit 406 can also provide communication with external storage (not shown), such as in a storage array, network attached storage, storage area network, one or more databases, or the like.

The computer storage media, such as the memory 404 and the mass storage devices in the peripheral storage 412, may be used to store software and data. For example, the computer storage media may be used to store the operating system (OS) 311 for the computing device 302, various device drivers for the device 302, various inputs provided by the user manually or via the user's host system 303 during the implementation and operation of the DP application 100, the data such as the kernel-specific interfaces of the operating systems of client computers 304-305, or any other type of content. The computer storage media also may store software applications such as a word processing application, a spreadsheet application, the DP application 100, and the like. The program code for the software applications and the OS 311 may be executed by the processor 402.

In one embodiment, a non-transitory, computer-readable data storage medium, such as, for example, the system memory 404 or the peripheral data storage unit 412 may store program code or software for the DP application 100 as per particular embodiments of the present disclosure. In the embodiment of FIG. 4, the system memory 404 is shown to include such program code. In the embodiment of FIG. 4, the DP application 100 may operate in conjunction with the OS 311 of the computing device 302. The processor 402 may be configured to execute the program code for the DP application 100, whereby the computer system 302 may be operative to perform various tasks associated with the DP application 100 as per the teachings of the present disclosure. In one embodiment, such tasks may include, for example, the process steps illustrated in FIG. 2 as well as other tasks discussed with reference to FIGS. 1 and 3 such as, for example, automatic transmission of privacy preferences to each client system, reception and processing of client system-specific data received from the plug-in modules executing in the client systems, establishing and maintaining communication between the host module 102 and each plug-in module 104, sending appropriate instruction to each client system-based plug-in module to prevent unauthorized copying of streaming content, and so on. The program code or software for the DP application 100 may be proprietary software or open source software which, upon execution by the processor 402, may enable the computer system 302 to perform operations related to online data security as per teachings of the present disclosure.

In particular embodiments, the computing device 302 may include an on-board power supply unit 414 to provide electrical power to various system components illustrated in FIG. 4. The power supply unit 414 may receive batteries or may be connectable to an AC electrical power outlet. In one embodiment, the power supply unit 414 may convert solar energy or other renewable energy into electrical power.

The example systems and devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The terms "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions), such as the program code for the DP application 100, that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   receiving, by a first computing system, an indication that a first user is hosting an online content-sharing session to provide a streaming content to a second user at a second computing system, wherein the first computing system and the second computing system are connected to each other via a communication network;
   receiving, by the first computing system, a privacy preference from the first user specifying an extent to which the second user is to be prevented from copying the streaming content using the second computing system, the privacy preference specifying prevention of screen captures, screenshots, or screen recordings of the streaming content by the second computing system;

upon receiving the indication that the online content-sharing session is upcoming, transmitting, by the first computing system, a plug-in module to the second computing system over the communication network, wherein the plug-in module operates to self-install in the second computing system; and instructing, by the first computing system, the plug-in module running in the second computing system to prevent a software executing in the second computing system from allowing the second user to copy the streaming content based on identifying a violation of the privacy preference, wherein the plug-in module operates to delete itself from the second computing system upon a determination that the online content-sharing session has concluded.

2. The method of claim 1, wherein the software executing in the second computing system includes one of the following:
   an operating system (OS) of the second computing system; and
   an application running on the second computing system.

3. The method of claim 1, wherein the online content-sharing session is hosted using an Instant Messenger (IM) service to deliver the streaming content to the second computing system.

4. The method of claim 1, wherein the plug-in module is part of an IM application running on the second computing system.

5. The method of claim 1, wherein transmitting the plug-in module comprises:
   transmitting, by the first computing system, the plug-in module to the second computing system prior to delivery of the streaming content to the second computing system.

6. The method of claim 1, wherein program code of the plug-in module is based on a trampoline function.

7. The method of claim 1, wherein instructing the plug-in module comprises:
   instructing, by the first computing system, the plug-in module through communication therewith over the communication network.

8. The method of claim 7, wherein the communication network is an Internet Protocol (IP) network.

9. The method of claim 1, wherein the privacy preference comprises one of the following:
   a first input that indicates that the second user is given permission to copy all of the streaming content;
   a second input that indicates that the second user is given permission to copy none of the streaming content;
   a third input that indicates a start point and an end point of a portion of the online content-sharing session during which the second user is given permission to copy the portion of the streaming content; and
   a fourth input that specifically identifies one or more portions in the streaming content that the second user is given permission to copy.

10. The method of claim 1, wherein receiving the privacy preference comprises one of the following:
    receiving, by the first computing system, the privacy preference from the first user once prior to commencement of the online content-sharing session; and
    receiving, by the first computing system, the privacy preference from the first user more than once throughout the online content-sharing session.

11. The method of claim 1, wherein instructing the plug-in module comprises:
    receiving, by the first computing system, a kernel-specific interface of an operating system (OS) of the second computing system from the plug-in module;
    analyzing, by the first computing system, the kernel-specific interface to determine an OS-specific instruction for the OS of the second computing system that triggers the OS to control copying of the streaming content by the second user as per the privacy preference of the first user; and
    sending, by the first computing system, the OS-specific instruction to the plug-in module to enable the plug-in module to interact with the OS of the second computing system to implement the privacy preference of the first user.

12. The method of claim 1, further comprising:
    facilitating, by the first computing system, insertion of one of the following into the streaming content during the online content-sharing session:
    a first watermark that is persistently displayed throughout the online content-sharing session;
    a second watermark that is intermittently displayed during the online content-sharing session; and
    a third watermark that is dynamically displayed during the online content-sharing session based on sensitivity of the streaming content.

13. A computing system comprising:
    a memory storing program instructions; and
    a processing unit coupled to the memory and operable to execute the program instructions, which, when executed by the processing unit, cause the computing system to:
    receive an indication that a first user is hosting an online content-sharing session to provide a streaming content to a second user at a client system, wherein the first computing system and the second computing system are connected to each other via a communication network;
    further receive a privacy preference from the first user specifying an extent to which the second user is to be prevented from copying the streaming content using the client system, the privacy preference specifying prevention of screen captures, screenshots, or screen recordings of the streaming content by the second computing system;
    upon receiving the indication that the online content-sharing session is upcoming, transmitting, by the first computing system, a plug-in module to the second computing system over the communication network, wherein the plug-in module operates to self-install in the second computing system; and
    instruct the plug-in module running in the client system to prevent a software executing in the client system from allowing the second user to copy the streaming content based on identifying a violation of the privacy preference, wherein the plug-in module operates to delete itself from the second computing system upon a determination that the online content-sharing session has concluded.

14. The computing system of claim 13, wherein the online content-sharing session uses an Instant Messenger (IM) service to deliver the streaming content to the client system, and wherein the software executing in the client system includes one of the following:
    an operating system (OS) of the client system; and
    an application running on the client system.

15. The computing system of claim 13, wherein the program instructions, upon execution by the processing unit, cause the computing system to transmit the plug-in module to the client system over an Internet Protocol (IP) network prior to delivery of the streaming content to the client system.

16. The computing system of claim 13, wherein the privacy preference comprises one of the following:
- a first input that indicates that the second user is given permission to copy all of the streaming content;
- a second input that indicates that the second user is given permission to copy none of the streaming content;
- a third input that indicates a start point and an end point of a portion of the online content-sharing session during which the second user is given permission to copy the portion of the streaming content; and
- a fourth input that specifically identifies one or more portions in the streaming content that the second user is permitted to copy;
- wherein the program instructions, upon execution by the processing unit, cause the computing system to perform one of the following:
  - receive the privacy preference from the first user once prior to commencement of the online content-sharing session; and
  - receive the privacy preference from the first user more than once throughout the online content-sharing session.

17. The computing system of claim 13, wherein the program instructions, upon execution by the processing unit, cause the computing system to:
- receive a kernel-specific interface of an operating system (OS) of the client system from the plug-in module;
- analyze the kernel-specific interface to determine an OS-specific instruction for the OS of the client system that triggers the OS to control copying of the streaming content by the second user as per the privacy preference of the first user; and
- send the OS-specific instruction to the plug-in module to enable the plug-in module to interact with the OS of the client system to implement the privacy preference of the first user.

18. A computer program product comprising a non-transitory computer-usable medium having computer-readable program code embodied therein, the computer-readable program code adapted to be executed by a first computing system to implement a method comprising:
- receiving an indication that a first user is hosting an online content-sharing session to provide a streaming content to a second user at a second computing system, wherein the first computing system and the second computing system are connected to each other via a communication network;
- further receiving a privacy preference from the first user specifying an extent to which the second user is to be prevented from copying the streaming content using the second computing system, the privacy preference specifying prevention of screen captures, screenshots, or screen recordings of the streaming content by the second computing system;
- upon receiving the indication that the online content-sharing session is upcoming, transmitting, by the first computing system, a plug-in module to the second computing system over the communication network, wherein the plug-in module operates to self-install in the second computing system; and
- instructing a plug-in module running in the second computing system to prevent a software executing in the second computing system from allowing the second user to copy the streaming content based on identifying a violation of the privacy preference, wherein the plug-in module operates to delete itself from the second computing system upon a determination that the online content-sharing session has concluded.

19. The computer program product of claim 18, wherein the method further comprises:
- receiving a kernel-specific interface of an operating system (OS) of the second computing system from the plug-in module;
- analyzing the kernel-specific interface to determine an OS-specific instruction for the OS of the second computing system that triggers the OS to control copying of the streaming content by the second user as per the privacy preference of the first user; and
- sending the OS-specific instruction to the plug-in module to enable the plug-in module to interact with the OS of the second computing system to implement the privacy preference of the first user.

* * * * *